United States Patent
Feng et al.

(10) Patent No.: US 10,429,886 B2
(45) Date of Patent: Oct. 1, 2019

(54) ASSEMBLY AND HOUSING FOR TERMINAL DEVICE

(71) Applicants: Fu Tai Hua Industry (Shenzhen) Co., Ltd., Shenzhen (CN); HON HAI PRECISION INDUSTRY CO., LTD., Taipei (TW)

(72) Inventors: Jun Feng, Shenzhen (CN); Han Yan, Shenzhen (CN); Dan Hu, Shenzhen (CN); Tien-Yen Chiang, Taipei (TW)

(73) Assignees: Fu Tai Hua Industry (Shenzhen) Co., Ltd., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 16/026,200

(22) Filed: Jul. 3, 2018

(65) Prior Publication Data
US 2019/0155334 A1 May 23, 2019

(30) Foreign Application Priority Data
Nov. 23, 2017 (CN) .......................... 2017 1 1184307

(51) Int. Cl.
*G06F 1/16* (2006.01)
*G06F 1/18* (2006.01)

(52) U.S. Cl.
CPC .......... *G06F 1/1626* (2013.01); *G06F 1/1607* (2013.01); *G06F 1/1635* (2013.01); *G06F 1/188* (2013.01)

(58) Field of Classification Search
None
See application file for complete search history.

(56) References Cited

U.S. PATENT DOCUMENTS

| | | | | |
|---|---|---|---|---|
| 8,749,963 B2 * | 6/2014 | Staats | ................... | G06F 1/1632 |
| | | | | 248/121 |
| 9,544,005 B2 * | 1/2017 | Wei | ...................... | H04B 1/3883 |
| 9,727,089 B2 * | 8/2017 | Zheng | ................... | G06F 1/1656 |
| 10,039,198 B2 * | 7/2018 | Francois | ............... | H05K 5/0234 |
| 10,191,522 B2 * | 1/2019 | Morrison | ................. | H05K 7/20 |
| 2008/0012425 A1 * | 1/2008 | Lanni | ........................ | G06F 1/26 |
| | | | | 307/38 |
| 2016/0294201 A1 * | 10/2016 | Avital | .................. | H01R 31/065 |

* cited by examiner

*Primary Examiner* — Courtney L Smith
(74) *Attorney, Agent, or Firm* — ScienBiziP, P.C.

(57) ABSTRACT

A housing includes a main body having an external surface, a power storage unit, a support unit, and a plug unit; the power storage unit, the support unit and the plug unit are positioned on one end of the external surface, the support unit is rotatably connected to the power storage unit and is used to support the housing be fixed at a certain angle, and the plug unit is rotatably connected to the support unit and is used to be plugged in a power source to charge the power storage unit. A terminal device assembly is also provided. The terminal device assembly includes the housing and a terminal device, the terminal device of the terminal device assembly is detachably received in the housing.

14 Claims, 6 Drawing Sheets

ASSEMBLY AND HOUSING FOR TERMINAL DEVICE

FIELD

The present disclosure relates to connections on terminal devices.

BACKGROUND

Terminal devices such as mobile phones are becoming bigger, and power consumption of mobile phones has increased significantly. The current housings do little more than protect the device from damage, or act as a simple support to facilitate a user to watch movies. These housings can be improved.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

Figure 1:
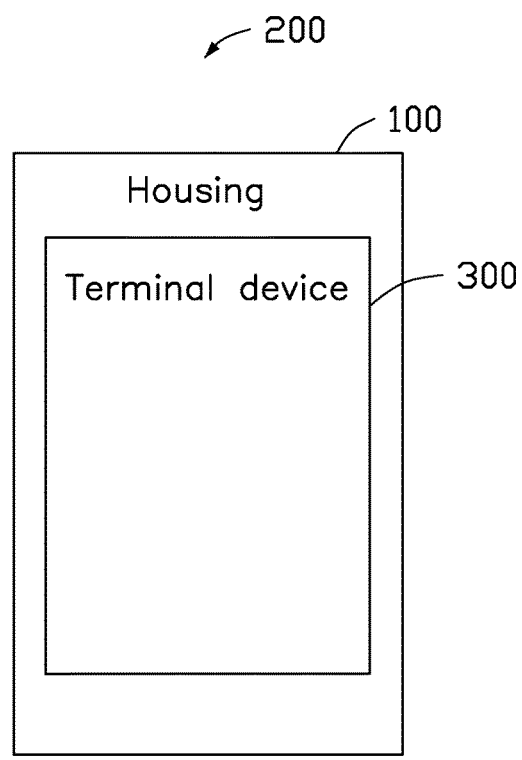
FIG. 1 is a functional block diagram of an embodiment of a terminal device.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The term "comprising" means "including, but not necessarily limited to"; it specifically indicates open-ended inclusion or membership in a so-described combination, group, series, and the like.

Embodiments of the present disclosure will be described in relation to the accompanying drawings.

Figure 4:
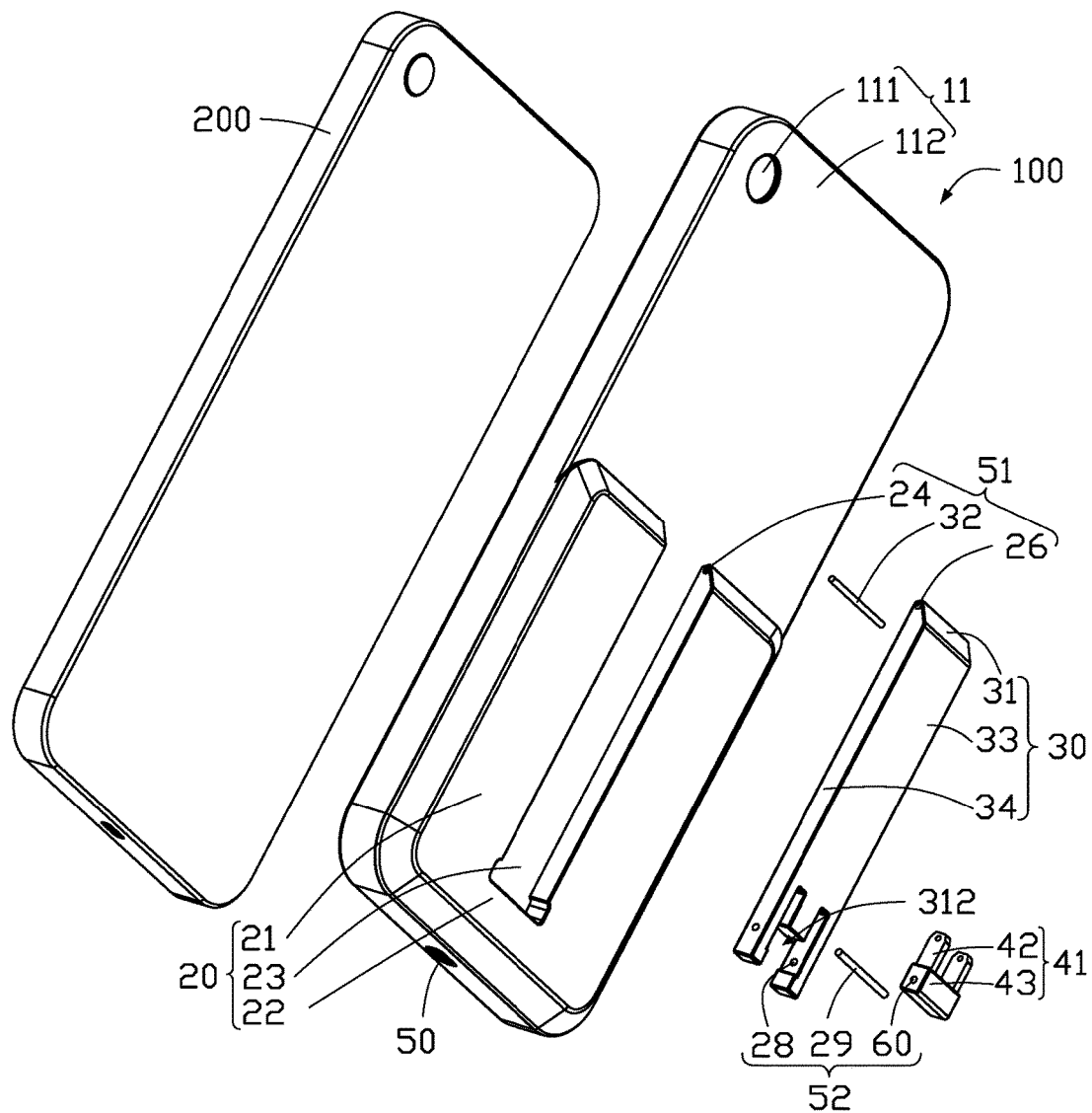
FIG. 4 is a disassembled view of the housing of FIG. 2.

With reference to FIG. 1 and FIG. 4, a terminal device assembly 200 includes a housing 100 and a terminal device 300. The terminal device 300 and the housing 100 can be independent devices. For example, the housing 100 can be a protective cover or an external battery pack, and the terminal device 300 can be detachably received in the housing 100. The terminal device assembly 200 can be a mobile phone, a personal digital assistant, a tablet, a laptop or other terminal device. The terminal device assembly 200 can further include, but is not limited to, other mechanical structures, electronic components, modules, and stored software.

In another embodiment, the terminal device 300 and the housing 100 can form a complete electronic device, i.e., the terminal device assembly 200. That is, the housing 100 is a part of the terminal device 300, for example, the housing 100 can be a back cover of the terminal device 300, and without the housing 100, the terminal device 300 cannot work or cannot have a complete appearance.

Figure 2:
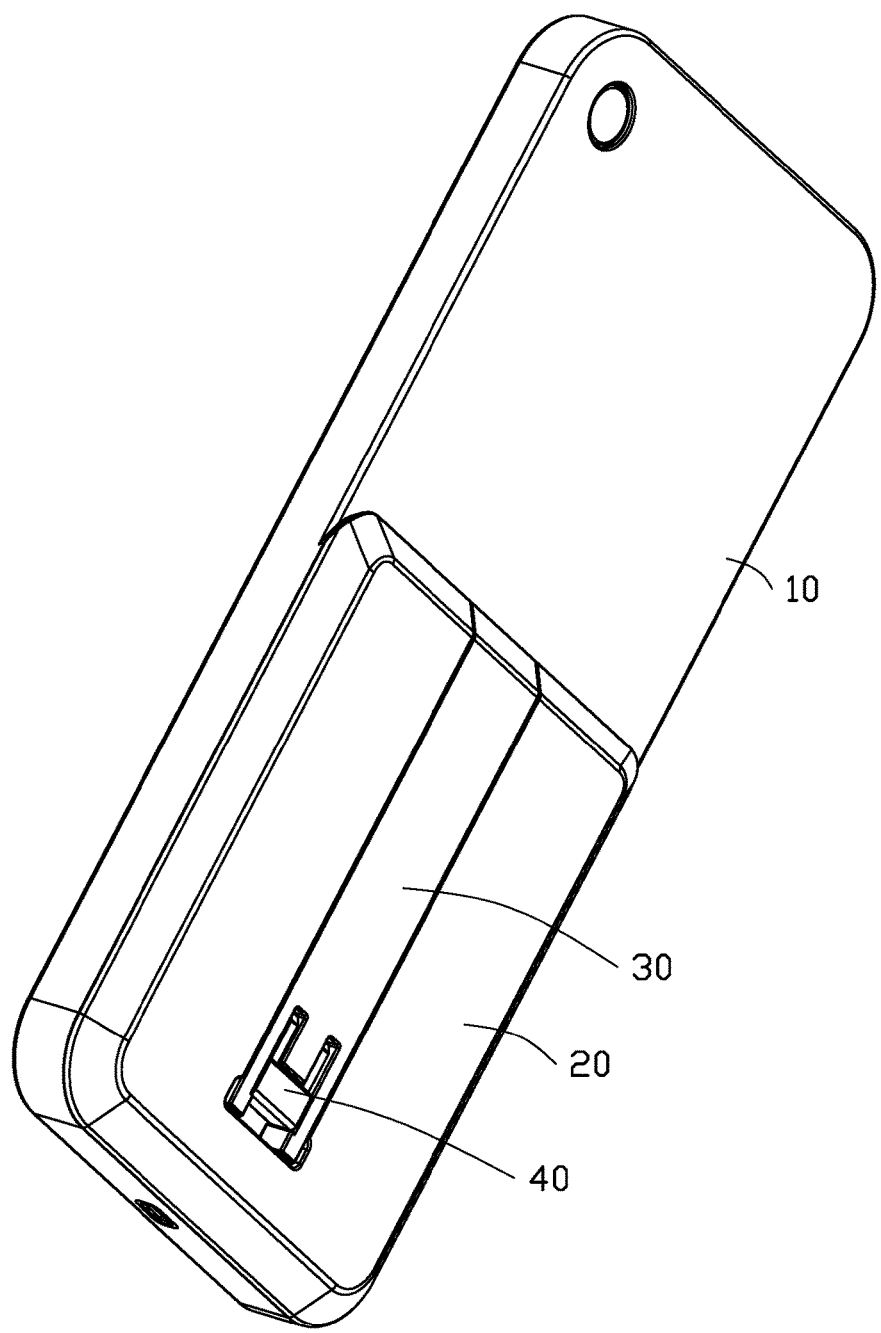
FIG. 2 is a schematic view of an embodiment of a housing for the device of FIG. 1.
Figure 3:
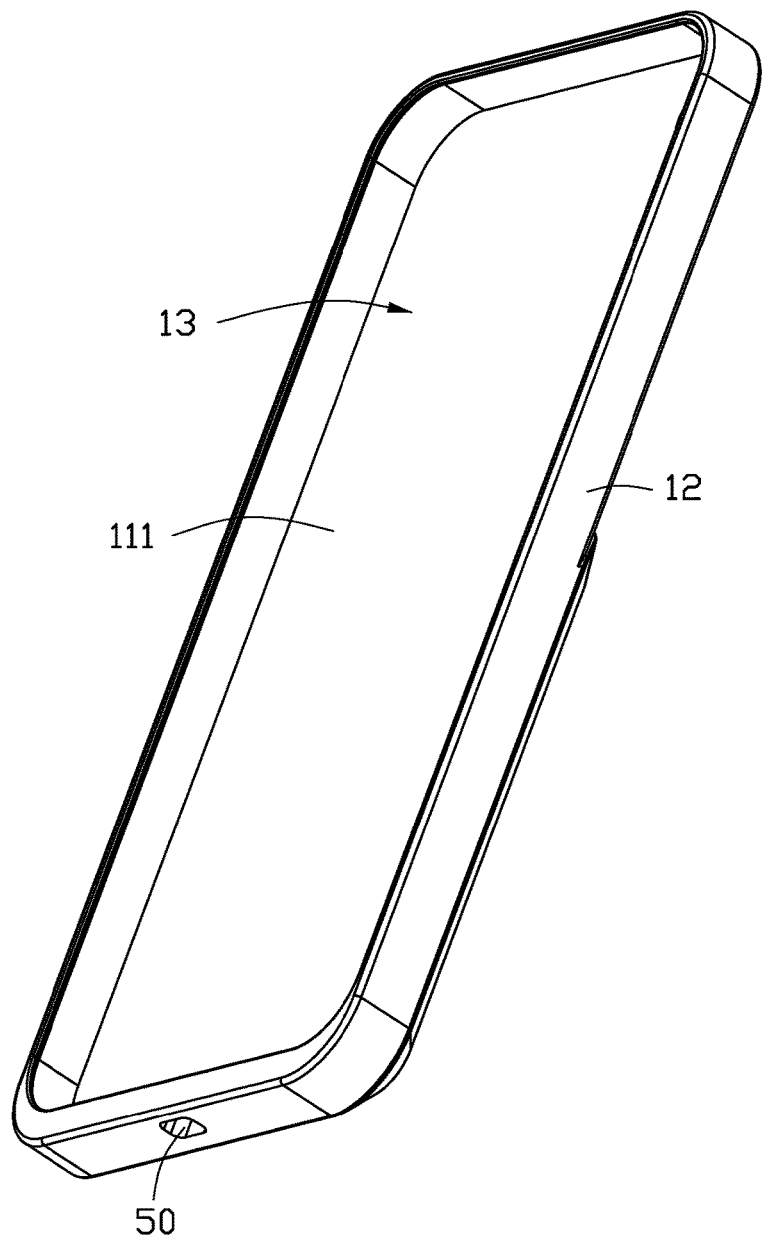
FIG. 3 is another schematic view of the housing of FIG. 2 viewed from another aspect.

FIG. 2 and FIG. 3 show that the housing 100 includes a main body 10, a power storage unit 20, a support unit 30, and a plug unit 40. The housing 100 can include, but is not limited to, other mechanical structures, electronic components, modules, and stored software. The main body 10 includes a bottom wall 11 and a side wall 12 surrounding the bottom wall 11. The bottom wall 11 and the side wall 12 form a container 13 there between. The container 13 is configured to receive the terminal device 300. The bottom wall 11 includes an internal surface 111 and an external surface 112. The power storage unit 20, the support unit 30, and the plug unit 40 are positioned on one end of the external surface 112.

With reference to FIG. 4, the power storage unit 20 is configured to receive a battery module, and can provide power for the terminal device 300. In one embodiment, the power storage unit 20 is approximately a U shaped structure, and the power storage unit 20 protrudes outwardly from the external surface 112. The power storage unit 20 is integrated with the main body 10. The power storage unit 20 includes a first groove 23, and the first groove 23 is configured to receive the support unit 30 and the plug unit 40. The power storage unit 20 includes two side portions 21 and a bottom portion 22. The two side portions 21 are parallel and spaced from each other, and the bottom portion 22 connects the two side portions 21. The bottom portion 22 and the side portion 21 cooperatively form the first groove 23 therein. The first groove 23 is preferably longitudinally extended.

The support unit 30 is rotatably connected to the power storage unit 20. In one embodiment, the support unit 30 is bar shaped, and includes a connecting end 31 and an operating end 34 opposite to the connecting end 31. The support unit 30 is rotatably connected to the power storage unit 20, thus the operating end 34 can be opened and fixed at a certain angle relative to the power storage unit 20. When the operating end 34 is opened and moves far from the first groove 23, the support unit 30 can support the housing 100, and which is convenient for a user to watch movies displayed by the terminal device 300.

The support unit 30 is rotatably connected to the power storage unit 20 through a first connection assembly 51. The first connection assembly 51 includes a hole 24, a first rotating shaft 32, and a first through hole 26. The hole 24 is positioned on the power storage unit 20. In one embodiment, the first connection assembly 51 includes two holes 24 in one end of the side portion 21 that is spaced from the bottom portion 22. The two holes 24 are positioned on opposite sides of the two side portions 21. The first through hole 26 is defined in the support unit 30. In one embodiment, the first through hole 26 is defined through the connecting end 31. The first rotating shaft 32 passes through the first through hole 26, and ends of the first rotating shaft 32 are rotatably engaged with holes 24. Therefore, the support unit 30 is rotatably connected to the power storage unit 20. The support unit 30 can be opened at a certain angle relative to the power storage unit 20, or be rotated towards the power storage unit 20 until wholly received in the first groove 23 of the power storage unit 20.

The support unit 30 is a substantially rectangular structure, and substantially matches the size and the shape of the first groove 23. The support unit 30 includes a support body 33. The connecting end 31 and the operating end 34 are at opposite ends of the support body 33. One end of the operating end 34 is next to the bottom portion 22. The connecting end 31 is flush with the end of the side portion 21 that is next to the hole 24.

The operating end 34 includes a second groove 312, and the second groove 312 is configured to receive the plug unit 40. The second groove 312 is a U shaped structure. One end of the second groove 312 is connected to the support body 33. The second groove 312 is defined through the operating end 34 and is fork-shaped for receiving the plug unit 40.

The plug unit 40 is rotatably connected to the support unit 30. When the plug unit 40 is opened and fixed at a certain angle, the plug unit 40 protrudes from the power storage unit 20 for conveniently connecting to a power supply, e.g., power or wall outlet, to provide power for the housing 100.

In one embodiment, the plug unit 40 is rotatably connected to the support unit 30 by a second connection assembly 52. The second connection assembly 52 includes a second through hole 28, a second rotating shaft 29, and a third through hole 60. The second through hole 28 is positioned on the support unit 30. In one embodiment, the second connection assembly 52 includes two second through holes 28 defined in the end of the operating end 34 that is far away from the operating body 33. The third through hole 60 is positioned on the plug unit 40. In one embodiment, the third through hole 60 is defined through the end of the plug unit 40 that connects to the operating end 34. The second rotating shaft 29 passes through the third through hole 60, and the two ends of the second rotating shaft 29 rotatably engage with the two second through holes 28. Thereby, the plug unit 40 is rotatably connected to the support unit 30. The plug unit 40 can be opened a certain angle relative to the support unit 30, or be rotated towards the support unit 30 until being received in the second groove 312 of the support unit 30.

The plug unit 40 is rotatably connected to the support body 33. The plug unit 40 includes a plug body 41. The size and the shape of the plug unit 40 substantially matches those of the second groove 312. The plug unit 40 further includes a pin part 42 and a fixing part 43. One end of the pin part 42 is fixed on the fixing part 43. The third through hole 60 is positioned on one end of the fixing part 43 away from the pin part 42.

The housing 100 further includes a port unit 50. The port unit 50 is positioned on one end of the external surface 112 that is near the bottom portion 22. In one embodiment, the port unit 50 can be an IO (Input/Output) interface electrically connected to the power storage unit 20. The housing 100 can be electrically connected to the terminal device 300 and other electronic devices through the port unit 50, to provide power for the other electrical devices or communicate with the terminal device 300 and the other electronic devices.

FIG. 1 shows the housing 100 working as a protective cover and as a power bank in use. Herein, the support unit 30 is received in the first groove 23, and the plug unit 40 is received in the second groove 312. The power storage unit 20, the support unit 30, and the plug unit 40 are substantially coplanar with each other to present a flat appearance. The housing 100 protects the terminal device 300 and avoids damage if the terminal device 300 is dropped. At the same time, the power storage unit 20 can charge other electronic devices or the terminal device 300 through the port unit 50. The housing 100 has charging function in addition to the housing function.

Figure 5:
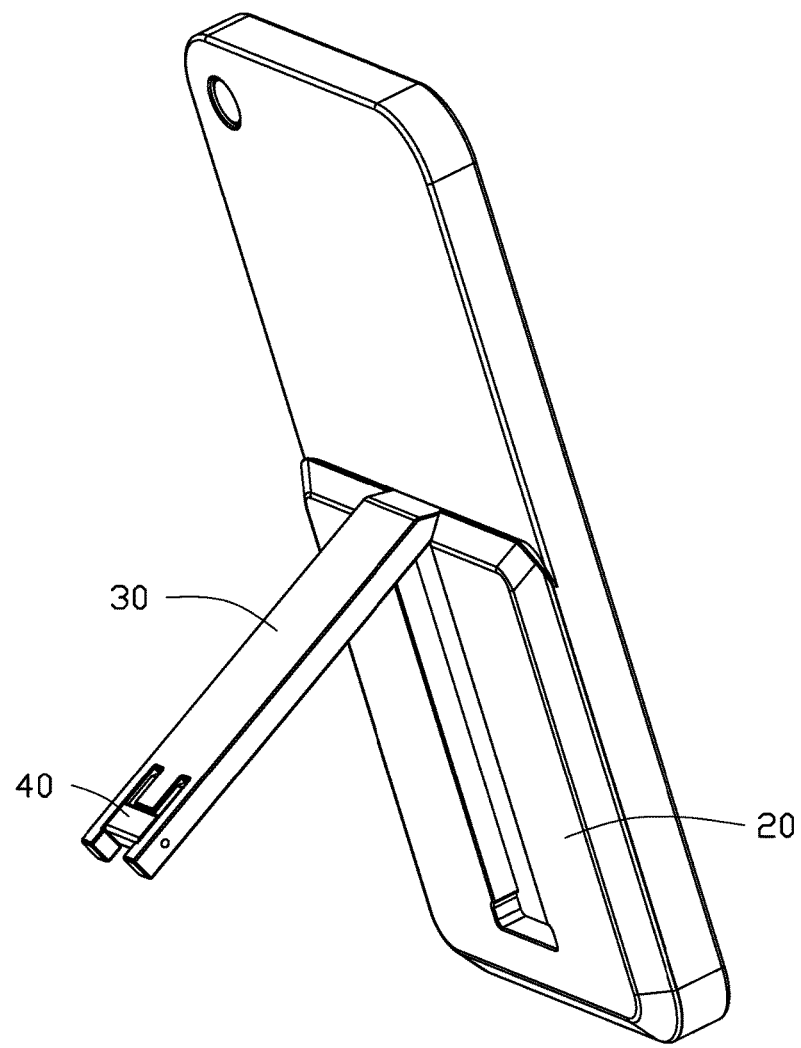
FIG. 5 shows the housing of FIG. 2 in use.

FIG. 5 shows the housing 100 in use as a support. The plug unit 40 is received in the second groove 312, and the plug unit 40 does not rotate relative to the support unit 30. The plug unit 40 can be opened and fixed at a certain angle relative to the support unit 30, and the certain angle can be 0° to 60°. When the certain angle is about 60°, the first rotating shaft 32 and the hole 24 have friction force to cause the support unit 30 can be fixed relative to the power storage unit 20 when the support unit 30 rotates to a certain angle, so that the housing 100 can be stable on a horizontal plane, and the housing 100 can have support function for the user to watch movies displayed by the terminal device 300 and protect the terminal device 300.

Figure 6:
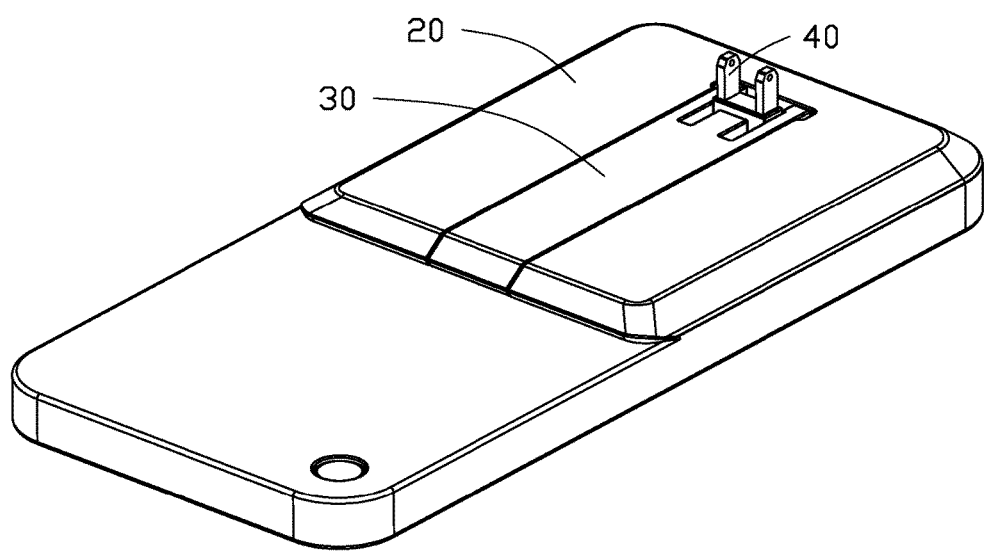
FIG. 6 shows an embodiment of the housing of FIG. 2 in another state of use.

FIG. 6 shows the housing 100 as a charging device ready for use. The support unit 30 is received in the first groove 23, and the support unit 30 does not rotate relative to the first groove 23. The plug unit 40 can be opened and fixed at a certain angle relative to the power storage unit 20, and the certain angle can be 0° to 90°. When the certain angle is 20° to 90°, the plug unit 40 can plug into a power interface. At this time, the housing 100 is ready to be used in a charging state, and have charging function.

The embodiments shown and described above are only examples. Many details are often found in the art such as the other features of an assembly and housing for terminal device. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. A housing, comprising: a main body having an external surface, a power storage unit, a support unit, and a plug unit; wherein the power storage unit, the support unit and the plug unit are positioned on one end of the external surface, the support unit is rotatably connected to the power storage unit, and the support unit is used to support the housing to be fixed at a certain angle, and the plug unit is rotatably connected to the support unit and is used to be plugged in to a power source to charge the power storage unit the power storage unit comprises: a bottom portion; and two side portions parallel and spaced apart from each other; the bottom portion and the side portions cooperatively forming a first groove, the first groove is configured to receive the support unit.

2. The housing of claim 1, wherein the support unit is rotatably connected to the power storage unit through a first connection assembly, the first connection assembly comprises: a hole is positioned on the power storage unit, a first through hole is defined in the support unit, and a first rotating shaft; the first rotating shaft passes through the first through hole, and ends of the first rotating shaft are rotatably engaged with the holes.

3. The housing of claim 1, wherein the support unit is a substantially rectangular structure, and substantially matches the size and the shape of the first groove.

4. The housing of claim 1, wherein the other end of the support unit is provided with a second groove, the second groove is configured to receive the plug unit.

5. The housing of claim 1, wherein the plug unit is rotatably connected to the support unit by a second connection assembly, the second connection assembly comprises a second through hole is positioned on the support unit, a third through hole positioned on the plug unit; and a second rotating shaft; the second rotating shaft passes through the third through hole, and the two ends of the second rotating shaft rotatably engage with the two second through holes.

6. The housing of claim 5, wherein the plug unit comprises: a plug body, the plug body comprises a pin part and a fixing part; one end of the pin part is fixed on the fixing part, the third through hole is positioned on one end of the fixing part away from the pin part.

7. The housing of claim 1, wherein the housing further comprises a port unit, the port unit is positioned on one end of the external surface that is near the bottom portion, the port unit is electrically connected to the power storage unit.

8. A terminal device assembly, comprising: a housing and a terminal device, the housing a main body having an external surface, a power storage unit, a support unit, and a plug unit; wherein the power storage unit, the support unit and the plug unit are positioned on one end of the external surface, the support unit is rotatably connected to the power storage unit, and the support unit is used to support the housing to be fixed at a certain angle, and the plug unit is rotatably connected to the support unit and is used to be plugged in to a power source to charge the power storage unit, the terminal device is detachably received in the housing, the power storage unit comprises: a bottom portion; and two side portions parallel and spaced from each other; the bottom portion and the side portions cooperatively forming a first groove, the first groove is configured to receive the support unit.

9. The terminal device assembly of claim 8, wherein the support unit is rotatably connected to the power storage unit through a first connection assembly, the first connection assembly comprises: a hole is positioned on the power storage unit, a first through hole is defined in the support unit, and a first rotating shaft; the first rotating shaft passes through the first through hole, and ends of the first rotating shaft are rotatably engaged with the holes.

10. The terminal device assembly of claim 8, wherein the support unit is a substantially rectangular structure, and substantially matches the size and the shape of the first groove.

11. The terminal device assembly of claim 8, wherein the other end of the support unit is provided with a second groove, the second groove is configured to receive the plug unit.

12. The terminal device assembly of claim 8, wherein the plug unit is rotatably connected to the support unit by a second connection assembly, the second connection assembly comprises a second through hole is positioned on the support unit, a third through hole positioned on the plug unit; and a second rotating shaft; the second rotating shaft passes through the third through hole, and the two ends of the second rotating shaft rotatably engage with the two second through holes.

13. The terminal device assembly of claim 12, wherein the plug unit comprises: a plug body, the plug body comprises a pin part and a fixing part; one end of the pin part is fixed on the fixing part, the third through hole is positioned on one end of the fixing part away from the pin part.

14. The terminal device assembly of claim 8, wherein the housing further comprises a port unit, the port unit is positioned on one end of the external surface that is near the bottom portion, the port unit is electrically connected to the power storage unit.

* * * * *